INVENTOR.
ALAN BLOCH
BY
ATTORNEY.

United States Patent Office 3,044,056
Patented July 10, 1962

3,044,056
AIRBORNE ANTENNA POSITIONING SYSTEM
Alan Bloch, New York, N.Y., assignor to General Precision Inc., a corporation of Delaware
Filed Aug. 28, 1957, Ser. No. 681,875
3 Claims. (Cl. 343—7.4)

This invention relates to systems for controlling angular position and more particularly to airborne systems for pointing a gun, antenna, or the like in obedience to controlling signals.

In general this invention relates to closed loop systems in which pointing error data are fed back to amend the control data. The usual closed loop system, however, takes appreciable time to amend the data, and if the error data be noisy and are smoothed the loop time constant may be larger than is desirable.

The present invention overcomes this difficulty, increasing the loop speed without greatly increasing apparatus complexity. It does this by introducing an additional source of steady and continuous pointing order data. The controlled axis is generally maintained in its desired direction of pointing by these data which do not need to be smoothed and which therefore are applied by means of a high speed loop. The error data, which do require smoothing, then have a less important part to play in controlling the axis, and even though smoothed and applied by means of a loop having a higher time constant do not unduly affect the accuracy of following.

This invention thus controls the direction of pointing of a controlled axis by means of two paths substantially decoupled from each other. One applies primary data to control the axis generally, and may be thought of as a non-feedback or open-loop path unless the interaction of the airplane pilotage be considered, when this path may be visualized as constituting a feedback loop including the airplane pilot function and the aerodynamic behavior of the airplane. The second or error path applies error data representing small aberrations of pointing angles to control the axis precisely. It comprises a feedback loop constituting a position servomechanism.

It is convenient to employ three coordinate systems: that in which the controlled axis angles are described relative to the base on which the axis element is mounted, the error coordinate system based on the instantaneous axial direction, and a third system in which it is convenient to describe the additional pointing order data. The general requirement for this third system and for the chosen additional data presented in it, is that the relative motion of the controlled axis in this third system be zero, negligible, or, at the worst, small and slow.

This invention is applicable to any control system which contains an error feedback loop, but is particularly applicable to an airborne control system for aiming a radar antenna at a target. The antenna beam is then the controlled axis, and its position relative to the airframe can be described in terms of two angles. These positioning angles may be said to be in airframe coordinates. Pointing error may be detected and sensed by utilizing microwave radio return from a target at which it is desired to point the antenna beam, the pointing in general being imperfect. This error is conveniently described in terms of two angles between the beam pointing direction and the target direction, and may be said to be in error coordinates.

In this case the third system of coordinates is conveniently based on the vertical direction and on the horizontal component of the aircraft air velocity direction. Data required in this system, which may be termed the airspeed system, define the aircraft heading direction, which will differ at any instant from the air velocity direction by the yaw and angle-of-attack angles. Data representing these angles are supplied to the controlled axis as rates rather than position orders to simplify data measurement and instrumentation.

The general purpose of this invention is to provide a fast feedback system for directing the angular position of a controlled axis.

Another purpose is, in an aircraft, to control the direction in which a component such as a radar beam antenna, is pointed.

Still another purpose is, in an aircraft, to provide a fast feedback loop for maintaining the beam of a microwave antenna pointing in the direction of a target.

Still another purpose is, in an aircraft containing a microwave beam system, to provide a fast data system maintaining the beam pointed in the general direction of a target and a smoothed error feedback loop precisely positioning the beam on the target.

A further understanding of this invention may be secured from the detailed description and drawings, in which.

Figure 1:
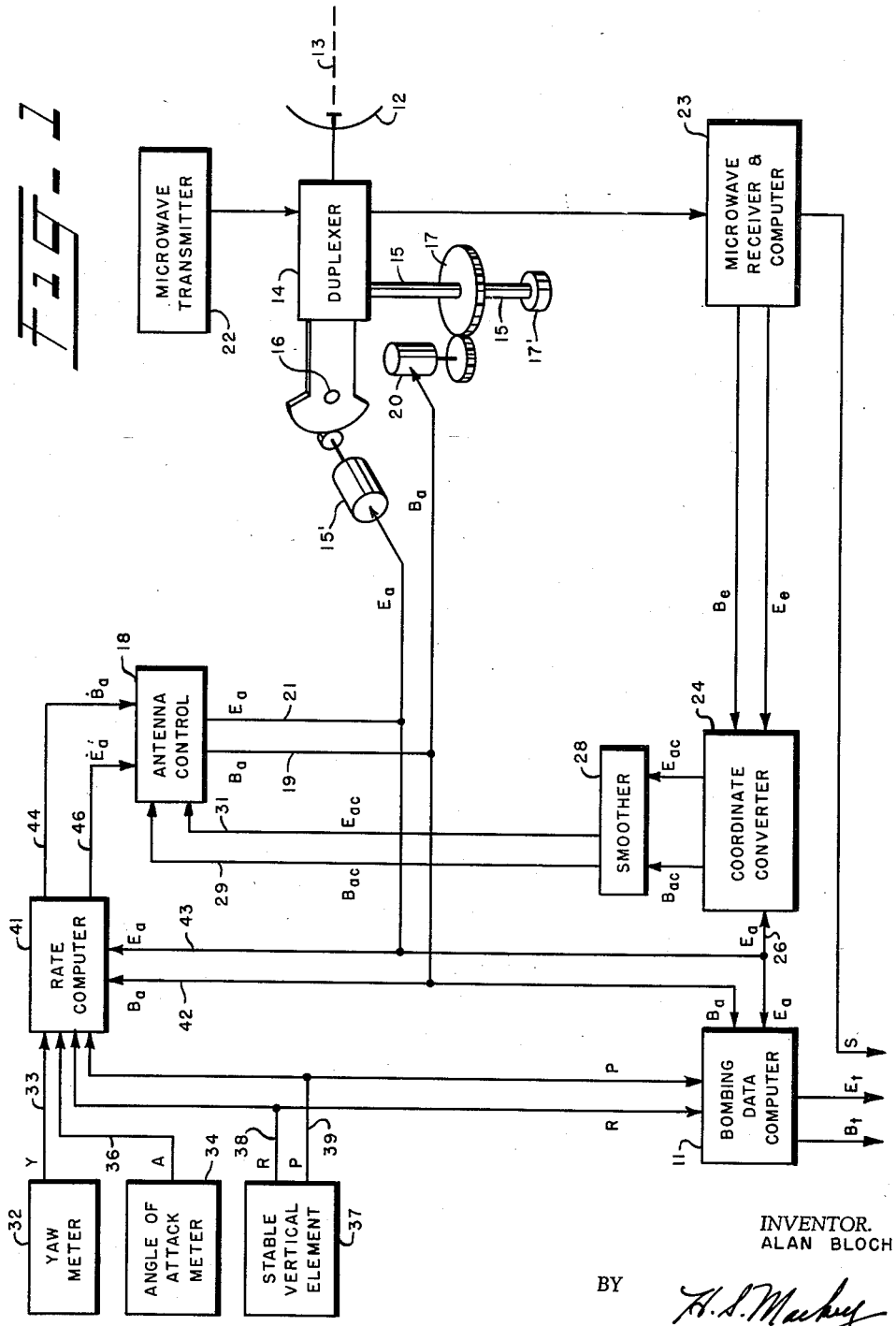
FIGURE 1 is a functional schematic diagram of one instrumentation of the invention.

Referring now to FIG. 1 showing the principal components required to instrument this invention, let it be supposed for the purposes of example, that these components are installed on an airplane, and that the output signals of these components are transmitted to a bombsight. It will be understood, of course, that this is not the necessary or sole use of this invention, but is here described merely as one example of the use thereof. A bombing data computer 11 is thus shown with the outputs of horizontal bearing $B_t$ and vertical elevation $E_t$, which are transmitted to the bombsight together with slant range $s$, but in place thereof any other utilization equipment may be substituted.

The target may be any object which can be detected and sensed by a microwave radio instrument and may be in the air, on the ground or on the water. It may be either stationary relative to the earth or moving. If the target is moving, moving target indication (MTI) techniques may be employed to simplify the design.

As example, let it be supposed that the target is on land and is stationary or is moving slowly. The airplane is piloted by any means, manually or automatically, in the general direction of the target and in generally level and low flight. That is, the forward prolongation of its ground track extends in the vicinity of the target. The microwave antenna is made to search by any means, manual or automatic, scanning the ground forward of the airplane along and near the ground track between selected maximum and minimum ranges. For the purpose of illustration and without limiting the scope of the invention let it be assumed that the scanning distance ranges from zero to three miles, and that the airplane height above the ground is one-half mile. Upon detection of the target by the radio instrument it passes to the tracking mode of operation in which its circuit is as schematically depicted in FIG. 1.

In this schematic figure a microwave radio beam antenna 12 emits a microwave beam in the direction represented by the dashed line 13. This is the controlled axis and the control of its direction is the function of the instrument of the invention. The antenna 12 is mounted on a mount including a duplexing circuit 14, bearings 16 for vertical movement and a shaft 15 with gear 17 for horizontal rotation. The shaft 15 is rotatable in bearings 17' which are fixed to the airframe and the vertical and horizontal motions of the controlled axis, being relative to the airframe and not to the earth, are better termed elevation and bearing motions, respectively. The coordinate system in which these bearing and elevation angles of the controlled axis relative to the airframe are measured, is termed the airframe coordinate system. In the selected example the elevation angles will in general be below the airplane's fore-and-aft axis and therefore in what follows such depression angles will be considered as having positive sense.

The bearing ($B_a$) and elevation ($E_a$) angles of the controlled axis 13 relative to the airframe are controlled by means of an antenna control 18 operating through control conductors 19 and 21 terminating at motors 20 and 15', which operate the antenna in bearing and elevation about the axes 15 and 16. In place of the motors 20 and 15', positioning servomechanisms may be employed.

The microwave signalling circuit includes a transmitter 22 and receiver 23, both connected to the duplexer 14. The receiver 23 includes a computer emitting error signals $B_e$ and $E_e$ proportional to the angular difference between the directions of the axis 13 and the line of sight from the antenna 12 to the target. These error signals $B_e$ and $E_e$ are measured in an error coordinate system based on the direction of the controlled axis 13. Thus the radio link between the airplane and its target together with means for detecting, sensing and computing these error angles constitute necessary elements in the error feedback circuit.

This feedback circuit includes a coordinate converter 24 which translates the error signals $B_e$ and $E_e$ given in the error coordinate system into equivalent correction signals $B_{ac}$ and $E_{ac}$ stated in the airframe coordinate system. This converter also requires the elevation angle $E_a$ in the airframe system of coordinates, which is supplied to it as indicated by the conductor 26 from the antenna control component 18. The coordinate converter 24 transmits its output bearing and elevation position correction angles $B_{ac}$ and $E_{ac}$ to a smoothing filter circuit 28, from which the smoothed data are transmitted through conductors 29 and 31 to the antenna control component 18.

The purpose of the smoothing filter circuit 28 is to pass the carrier and the relatively slow variations thereof representing changes in error amplitudes, and to eliminate electrical "noise" of relatively much higher frequency. When the carrier is direct current the smoothing filter circuit 28 consists merely of a simple low pass filter having a series resistor or inductor and one or two shunt capacitors, in either T or pi form. The design of such filters is described in Radio Engineers' Handbook, by F. E. Terman, 1st ed. on page 228.

A yaw meter 32 includes, for example, differential air pressure sampling orifices in the undisturbed air stream ahead of the airplane and impresses a signal Y on conductor 33 representing the instantaneous yaw angle between the airplane fore-aft datum line and the air velocity direction in a plane parallel to the datum line and the airplane's transverse axis. An angle-of-attack meter 34 also secures signals from sampling orifices and impresses a signal A on conductor 36 representing the angle between the airplane datum line and the air velocity direction in a plane perpendicular to the above plane.

A stable vertical element 37 impresses roll and pitch angle signals on conductors 38 and 39. These angles measure rotations of the airframe and the system of coordinates based thereon relative to the vertical direction. One form of such meter may consist of an aircraft vertical gyroscope gimbaled in the airframe with synchro takeoffs at the roll and pitch gimbal axes emitting the electrical roll and pitch signals R and P.

The four signals representing yaw, angle-of-attack, roll and pitch are applied to a rate computer 41, which also receives position signals $B_a$ and $E_a$ through conductors 42 and 43. From these six signals the rate computer computes the rates at which the bearing and elevation signals are changing, and transmits these rates through conductors 44 and 46 to the antenna control component 18. These rate signals are termed $\dot{B}_a$ and $\dot{E}_a$.

The microwave antenna 12 and its control component 18 are thus under control of two independent and separate sets of data which have only very slight intercoupling, if indeed in practical operation they have any. One set consists of error signals generated by misalignment of the antenna beam on the target, and transmitted over a feedback loop which in its complete circuit includes the microwave link, the radio receiver and computer 23, coordinate converter 24, smoother 28, antenna control 18, and antenna pointing mechanism operating about axes defined by bearings 16 and 17'. This loop constitutes a position servomechanism.

The other set of data consists of rate signals representing the rate of change of the airframe coodinate system relative to the third system involving air velocity direction and the vertical direction. This set of data may be considered to be applied to the antenna by means of a feedback loop involving the airplane piloting means.

The rate computer 41 includes conventional trigonometric and algebraic computing elements which solve the following equations:

$$\dot{B}_a = E_a \dot{R} - \cos R \frac{d}{dt}(Y \cos R + A \sin R) + \dot{P} \sin R \quad (1)$$

$$\dot{E}_a = -B_a \dot{R} + \sin R \frac{d}{dt}(Y \cos R + A \sin R) + \dot{P} \cos R \quad (2)$$

The dots in the terms $\dot{B}_a$, $\dot{E}_a$, $\dot{R}$, and $\dot{P}$ indicate that they are first order time derivatives of the basic terms. These equations are instrumented in accordance with the schematic diagram of FIG. 2. The computing elements are of only six kinds, their functions being differentiation, addition, subtraction, multiplication, and derivation of the sine and cosine. Several instrumentations of each function are described in Radiation Laboratory Vol. 21, by Greenwood, Holdam and MacRae, in Chapters 3, 4 and 5.

Figure 2:
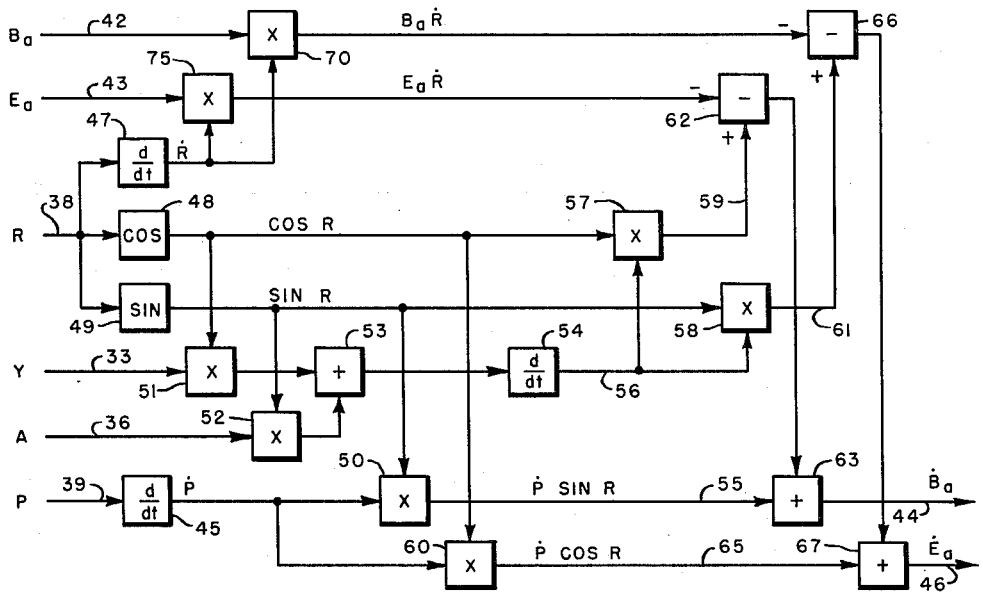
FIGURE 2 is a schematic diagram of the rate computer of FIG. 1.

In FIG. 2 the roll signal R is applied on conductor 38 to differentiating element 47, cosine element 48 and sine element 49. The pitch signal P is differentiated in element 45 to $\dot{P}$, which is multiplied in multiplier 50 by the sine R output of sine generator 49 to form a signal representing $\dot{P} \sin R$ on conductor 55. The signal representing $\dot{P}$ is also multiplied in multiplier 60 by the cosine R output of cosine generator 48 to form a signal having a value $\dot{P} \cos R$ on conductor 65. The signal equal to cosine R is also multiplied by the yaw signal Y at element 51 and the signal equal to sine R is multiplied by the angle-of-attack signal A at element 52. The two products are added at element 53 and the sum is differentiated at element 54. The output on conductor 56 is multiplied in elements 57 and 58 by signals equal to cosine R and sine R, resulting in signals equal to the terms $$\cos R \frac{d}{dt}(Y \cos R + A \sin R)$$

and $$\sin R \frac{d}{dt}(Y \cos R + A \sin R)$$

on conductors 59 and 61 respectively. These are the middle terms of Equations 1 and 2 respectively. A signal equal to $B_a$ is multiplied by a signal equal to $\dot{R}$ in multiplier 70 to form signals representing $B_a\dot{R}$, and a signal equal to $E_a$ is multiplied by the signal representing $\dot{R}$ in multiplier 75 to form a signal equal to $E_a\dot{R}$. The middle term of Equation 1 is then subtracted from the signal representing $E_a\dot{R}$ in element 62 and then added to the signal representing $\dot{P} \sin R$ in element 63, forming the value of Equation 1, $\dot{B}_a$, at output conductor 44. Similarly a signal representing $B_a\dot{R}$ is subtracted from the middle term of Equation 2 in element 66 and the difference is added in element 67 to the signal equal to $\dot{P} \cos R$, forming $\dot{E}_a$ on conductor 46, the value of Equation 2.

Figure 3:
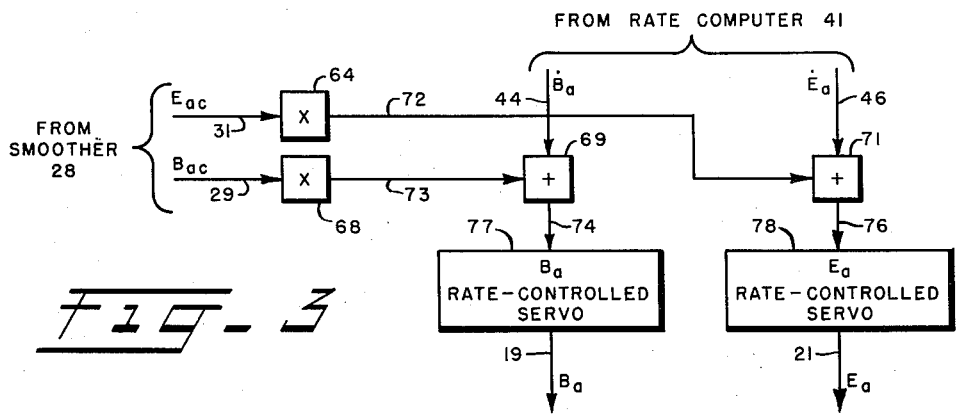
FIGURE 3 is a schematic diagram of the antenna control component of FIG. 1.

The antenna control component 18 is shown schematically in FIG. 3. Correction signals $E_{ac}$ and $B_{ac}$ are received through conductors 31 and 29 respectively and are multiplied by constants in multipliers 64 and 68 so as to control the tracking correction time constants of the system. The products are transmitted through conductors 72 and 73 respectively to adding components 71 and 69. To these adders are also introduced the rates $\dot{E}_a$ and $\dot{B}_a$ through conductors 46 and 44 respectively. The sums are transmitted through conductors 76 and 74 to rate-controlled servomechanisms 78 and 77 which produce the desired values of the quantities $E_a$ and $B_a$ for transmission through conductors 21 and 19 to the remainder of the system.

Figure 4:
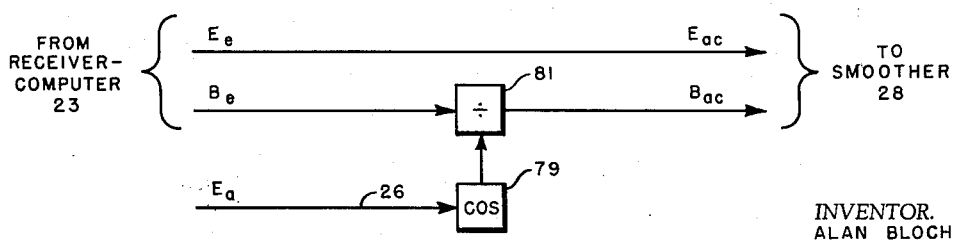
FIGURE 4 is a schematic diagram of the coordinate converter of FIG. 1.

The coordinate converter 24, FIG. 1, can be a very simple device, as indicated in FIG. 4. The elevation error signal $E_e$ is used without further change as an elevation correction signal $E_{ac}$, but the bearing signal $B_e$ is divided by the cosine of elevation before use. The cosine function generator 79 and dividing circuit 81 are described in the previously mentioned reference.

The microwave receiver and computer 23 may be an airborne equivalent of the well-known U.S. Signal Corps set SCR–584, described in Radiation Laboratory Series Vol. 1 by Ridenour and similar to it in all respects except weight and housing, or may be an equivalent instrument for tracking a target by microwave radio and emitting error signals representing the orthogonal angular pointing error.

What is claimed is:

1. A system for controlling the angular position of the controlled axis of a device movably carried by a vehicle comprising, means for detecting the bearing and elevation position error of the controlled axis of said device, means for deriving bearing error and elevation error signals therefrom, means converting said bearing error and elevation error signals to vehicle frame bearing error and elevation error signals, said vehicle frame bearing error and elevation error signals being representative of the bearing angle and elevation angle misplacement of the controlled axis of said device with respect to the vehicle on which it is mounted, means for determining the angular position of said vehicle with respect to space coordinates and producing therefrom vehicular angular position signals, means deriving bearing rate and elevation rate signals from said vehicular angular position signals, said bearing rate signals being representative of the rate of change of the bearing angular position of the controlled axis of said device as a result of change in angular position of said vehicle and said elevation rate signals being representative of the rate of change of the elevation angular position of the controlled axis of said device as a result of change in angular position of said vehicle, means combining said vehicle frame bearing error signals and said bearing rate signals to produce bearing correction signals, means combining said vehicle frame elevation error signals and said elevation rate signals to produce elevation correction signals, means correcting the bearing angle of the controlled axis of said device by said bearing correction signal, and means correcting the elevation angle of the controlled axis of said device by said elevation correction signal.

2. A system for controlling the angular position of the controlled axis of a device movably carried by a vehicle comprising, means for detecting the bearing position error of the controlled axis of said device, means for deriving bearing error signals therefrom, means converting said bearing error signals to vehicle frame bearing error signals representative of the bearing angle misplacement of the controlled axis of said device as respects the vehicle on which it is mounted, means for detecting the elevation position error of the controlled axis of said device, means for deriving elevation error signals therefrom, means converting said elevation error signals to vehicle frame elevation error signals representative of the elevation angle misplacement of the controlled axis of said device as respects the vehicle on which it is mounted, means for sensing the angular position of the vehicle with respect to space coordinates and producing therefrom vehicular angular position signals, computer means having said vehicular angular position signals and signals representative of the bearing angle and elevation angle of said device impressed thereon and producing therefrom bearing rate signals representative of the rate of change of bearing angle of said device and elevation rate signals representative of the rate of change of elevation angle of said device resulting from change in angular position of said vehicle, adding means adding said vehicle frame bearing error signals and said bearing rate signals to produce bearing correction signals, adding means adding said vehicle frame elevation error signals and said elevation rate signals to produce elevation correction signals, means correcting the bearing angle of said device by said bearing correction signals, and means correcting the elevation angle thereof by said elevation correction signals.

3. An angle control system for controlling the angular position of an aircraft microwave beam antenna in tracking a target comprising, means for transmitting signals from said antenna toward said target and deriving error signals from the target echo signals thereof representing tracking error displacement of the antenna as respects said target, means deriving bearing and elevation angle positional correction signals from said error signals, summing means receiving said positional correctional signals, means detecting vertical direction and emitting roll and pitch signals representative of the angular relations of said aircraft to said vertical direction, means detecting air velocity direction and emitting yaw and angle-of-attack signals representative of the angular relations of said aircraft to said air velocity direction, means deriving from said roll, pitch, yaw and angle-of-attack signals and from the bearing and elevation of said antenna relative to said aircraft bearing rate and elevation rate signals, means applying said bearing rate and elevation rate signals to said summing means, and means controlling the angular position of said antenna by the sum signals of said summing means.

References Cited in the file of this patent
UNITED STATES PATENTS

| | | |
|---|---|---|
| 2,414,108 | Knowles | Jan. 14, 1947 |
| 2,586,817 | Harris | Feb. 26, 1952 |
| 2,705,792 | Harris | Apr. 5, 1955 |
| 2,715,776 | Knowles | Aug. 23, 1955 |
| 2,819,461 | Bryan | Jan. 7, 1958 |